(12) United States Patent
Zhou

(10) Patent No.: US 12,225,885 B1
(45) Date of Patent: Feb. 18, 2025

(54) PET TRAINER WITH POSITIONING AND TRACKING FUNCTION

(71) Applicant: Shenzhen Kaisennick Intelligent Technology Co., Ltd., Shenzhen (CN)

(72) Inventor: Yongkai Zhou, Shenzhen (CN)

(73) Assignee: Shenzhen Kaisennick Intelligent Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/736,286

(22) Filed: Jun. 6, 2024

(51) Int. Cl.
*A01K 27/00* (2006.01)
*A01K 11/00* (2006.01)
*A01K 15/02* (2006.01)

(52) U.S. Cl.
CPC .......... *A01K 27/009* (2013.01); *A01K 11/006* (2013.01); *A01K 15/021* (2013.01); *A01K 27/001* (2013.01)

(58) Field of Classification Search
CPC .. A01K 27/009; A01K 11/006; A01K 15/021; A01K 27/001; A44B 11/258; A44B 11/2592
See application file for complete search history.

(56) References Cited

U.S. PATENT DOCUMENTS

| | | | | |
|---|---|---|---|---|
| 384,037 A * | 6/1888 | Hill | ............ | A01K 27/001 119/863 |
| 424,197 A * | 3/1890 | Harrison | ............ | A01K 27/001 119/863 |
| 2,453,010 A * | 11/1948 | Grafiln | ............ | A01K 27/001 119/864 |
| 3,817,218 A * | 6/1974 | Bongiovanni | ....... | A01K 27/001 119/856 |
| 4,044,725 A * | 8/1977 | Miller | ............ | A01K 27/001 59/84 |
| 5,501,180 A * | 3/1996 | Beere | ............ | A01K 27/001 2/338 |
| 5,818,354 A * | 10/1998 | Gentry | ............ | A01K 11/006 340/539.1 |

(Continued)

FOREIGN PATENT DOCUMENTS

WO WO-2014025243 A1 * 2/2014 ......... A44B 11/2523

OTHER PUBLICATIONS

Original & Translation—DE 20319176 (Year: 2004).*
Original & Translation—KR 20150080999 (Year: 2015).*

*Primary Examiner* — David J Parsley
*Assistant Examiner* — Kari A Bradberry
(74) *Attorney, Agent, or Firm* — Birchwood IP

(57) ABSTRACT

A pet trainer with positioning and tracking function is provided, which includes two collar bodies symmetrically distributed left and right; an installation seat provided between front ends of the two collar bodies and being a rectangular cavity structure; and a receiver body provided in the cavity of the installation seat. Due to a rubber sheath sleeved on a restraint belt, adjacent two rubber sheaths can be tightly connected by a mutual cooperation between a connection plug and a connection slot, thereby protecting the restraint belt, effectively avoiding the restraint belt from being bitten or damaged by a pet dog, ensuring use reliability. This solves problems that existing pet trainers may cause discomfort when the pet dog wears the collar for a long time, the restraint belt can be easily scratched and teared, and be damaged. In addition, the trainer needs to be charged and maintained regularly.

9 Claims, 11 Drawing Sheets

(56) References Cited

U.S. PATENT DOCUMENTS

| Patent/Publication No. | | Date | Inventor | Classification |
|---|---|---|---|---|
| 5,850,807 | A * | 12/1998 | Keeler | A01K 27/006 119/799 |
| 5,952,925 | A * | 9/1999 | Secker | A01K 15/02 340/573.2 |
| 6,606,967 | B1 * | 8/2003 | Wolfe, Jr. | A01K 27/001 119/862 |
| 9,756,833 | B2 * | 9/2017 | So | A01K 15/021 |
| 2007/0039086 | A1 * | 2/2007 | Moore | A01K 27/001 2/338 |
| 2007/0221140 | A1 * | 9/2007 | Warren | A01K 11/008 119/859 |
| 2007/0222624 | A1 * | 9/2007 | Eicken | G08B 7/06 340/573.3 |
| 2008/0156277 | A1 * | 7/2008 | Mainini | A01K 27/009 119/718 |
| 2009/0038670 | A1 * | 2/2009 | Shu | G01S 19/14 119/859 |
| 2009/0235874 | A1 * | 9/2009 | Sullivan | A01K 27/001 119/864 |
| 2009/0289844 | A1 * | 11/2009 | Palsgrove | A01K 15/021 342/357.55 |
| 2011/0017150 | A1 * | 1/2011 | Caputo | A01K 27/009 369/7 |
| 2011/0061605 | A1 * | 3/2011 | Hardi | A01K 27/009 340/573.3 |
| 2011/0094069 | A1 * | 4/2011 | Palmer | D04G 5/00 24/302 |
| 2011/0139088 | A1 * | 6/2011 | Gordon | A61M 5/14244 600/300 |
| 2011/0205069 | A1 * | 8/2011 | Liu | A01K 27/009 340/573.3 |
| 2011/0298615 | A1 * | 12/2011 | Rich | A01K 15/023 119/859 |
| 2012/0067299 | A1 * | 3/2012 | Vollmecke | A01K 27/001 119/863 |
| 2016/0066543 | A1 * | 3/2016 | Couillard | A01K 27/001 119/856 |
| 2016/0242393 | A1 * | 8/2016 | Kennedy | A01K 27/006 |
| 2016/0324125 | A1 * | 11/2016 | Jasmine, Sr. | A01K 27/003 |
| 2017/0135315 | A1 * | 5/2017 | Marmen | A01K 15/021 |
| 2017/0202183 | A1 * | 7/2017 | Lou | B32B 25/20 |
| 2017/0265432 | A1 * | 9/2017 | Anderton | A01K 15/029 |
| 2017/0372580 | A1 * | 12/2017 | Vivathana | G01S 19/42 |
| 2018/0098525 | A1 * | 4/2018 | Lee | A01K 27/008 |
| 2018/0110205 | A1 * | 4/2018 | Czarnecky | A01K 15/021 |
| 2018/0125035 | A1 * | 5/2018 | Bellon | A01K 27/001 |
| 2018/0125038 | A1 * | 5/2018 | Hord | G08B 15/00 |
| 2018/0153137 | A1 * | 6/2018 | Goetzl | A01K 27/001 |
| 2018/0153138 | A1 * | 6/2018 | Goetzl | A01K 15/029 |
| 2019/0304345 | A1 * | 10/2019 | Stapleton | G09F 3/08 |
| 2020/0068852 | A1 * | 3/2020 | Ramsay | A01K 29/005 |
| 2020/0245590 | A1 * | 8/2020 | Hill | A01K 29/005 |
| 2021/0051922 | A1 * | 2/2021 | Nicoll | A01K 15/021 |
| 2021/0092937 | A1 * | 4/2021 | Sapp | G06Q 50/01 |
| 2022/0151207 | A1 * | 5/2022 | Mott | A01K 29/005 |
| 2022/0256812 | A1 * | 8/2022 | Huber | A01K 27/001 |
| 2022/0312741 | A1 * | 10/2022 | Hathaway | A01K 27/001 |
| 2022/0386568 | A1 * | 12/2022 | Myton | A01K 27/009 |
| 2023/0011224 | A1 * | 1/2023 | He | A01K 27/001 |
| 2023/0172162 | A1 * | 6/2023 | Johnson | A01K 15/021 119/712 |
| 2023/0320321 | A1 * | 10/2023 | Hipsley | A01K 27/001 119/859 |
| 2023/0345907 | A1 * | 11/2023 | Smith | A01K 15/023 |
| 2023/0389522 | A1 * | 12/2023 | Koo | A01K 27/00 |
| 2024/0032510 | A1 * | 2/2024 | Abraham | A01K 29/005 |
| 2024/0156063 | A1 * | 5/2024 | Nytko | A01K 27/001 |

\* cited by examiner

PET TRAINER WITH POSITIONING AND TRACKING FUNCTION

TECHNICAL FIELD

The present disclosure relates to the field of dog trainer technologies, and in particular, to a pet trainer with location tracking function.

BACKGROUND

The dog trainer is an electronic collar that assists an owner in correcting pet dog behavior training. This electronic collar can help the owner trains his pet dog within a certain range, a signal drive instruction such as a sound signal, vibration signal, or electric shock signal, is sent through a remote transmitter. After receiving the signal instruction, by a receiver, the receiver will perform a corresponding mechanical activity to remind the pet dog of its behavior and change its bad habits.

The existing pet trainers with positioning and tracking functions can cause discomfort when the pet dog wears the collar for a long time, the pet dog may be prone to scratch and bite a restraint belt, thus it is damaged and affecting its reliability. In addition, the trainer needs to be regularly charged and maintained, and frequent disassembly and wearing can cause a connection buckle to loosen and easily become loose. In addition, the pet owner usually uses remote control training, and a detachment of the collar is difficult to detect in a timely manner, thus the pet dog may play with and bite the collar.

SUMMARY

In view of this, the present disclosure provides a pet trainer with positioning and tracking function to solve a problem that existing pet trainers with positioning and tracking function may cause a discomfort when the pet dog wears a collar for a long time, the pet dog may be prone to scratch and bite a restraint belt, and it is caused to be damaged. In addition, the trainer is needed to be regularly charged and maintained, and frequent disassembly and wearing can lead to lose a connection buckle.

The present disclosure provides a pet trainer with positioning and tracking function, including:
  two collar bodies that are symmetrically distributed at left and right sides, the two collar bodies are a left collar body and a right collar body;
  an installation seat provided between front ends of the two collar bodies and being a rectangular cavity structure,
  a receiver body provided in the cavity of the installation seat;
  a fixed seat provided on opposite outer sides of the two collar bodies; one side of the fixed seat is provided with a dual headed motor; rear ends of one left collar body and one right collar body are respectively provided with a left connection seat and a right connection seat; the left connection seat is provided with an alarm component, and the alarm component is provided with a squeeze button.

In an embodiment of the present disclosure, the two collar bodies both includes a restraint belt, a connection joint, a connection slider, a connection sleeve, and a rubber sheath; one end of the restraint belt is provided with the connection joint, there are two connection sliders provided on the connection joint, and the two connection sliders are symmetrically distributed up and down; the other end of the restraint belt is provided with the connection sleeve, the restraint belt is sleeved with the rubber sheath, and there are a plurality of rubber sheaths distributed in a linear array manner;

one end of each rubber sheath is provided with a connection plug, and the other end of the rubber sheath is provided with a connection slot; the connection plug of the rubber sheath is inserted into the connection slot of one adjacent rubber sheath.

In an embodiment of the present disclosure, left and right side walls of the installation seat are provided with two limit sliding grooves, and left and right ends of the installation seat are provided with a connection frame; the installation seat is slidably connected to the connection slider of the connection joint through the limit sliding groove, and the connection frame is fixedly connected to the connection joint through a bolt; a front of the connection frame is provided with a positioning clamp groove, and there are two stop blocks at a position of the positioning clamp groove.

In an embodiment of the present disclosure, a front of the receiver body is provided with a display panel, a rear of the receiver body is provided with a locator, one side of the locator is provided with a charging port, left and right ends of the receiver body are provided with an installation sleeve tube, the installation sleeve tube is provided with a positioning clamp block, a rear of the receiver body is provided with an electric shock absorber, the electric shock absorber is provided with an electric shock column, and the electric shock column runs through a rear wall of the installation seat;

one side of the positioning clamp block is provided with a sliding rod, which is sleeved with a stretching spring; the sliding rod is inserted into the installation sleeve tube, and two ends of the stretching spring are respectively connected to the installation sleeve tube and the positioning clamp block; the positioning clamp block is clamped in the positioning clamp groove, and the positioning clamp block is in contact with the stop block.

In an embodiment of the present disclosure, one side of the fixed seat is provided with two elastic straps, the two elastic straps are sleeved on the rubber sheath, and an installation cover is provided on the other side of the fixed seat, a support frame is provided in the installation cover; the support frame is fixedly connected to the fixed seat, and the dual headed motor is provided on the support frame.

In an embodiment of the present disclosure, upper and lower rotation ends of the dual headed motor are respectively provided with a rotation block, the two rotation blocks are both in a shape of semicircular cylinder; front and rear sides of the dual headed motor are provided with a buffer spring by connecting binaural, and the buffer spring is rotatably connected to the support frame by connecting the binaural; one side of the dual headed motor is provided with a connection rod by connecting the binaural, and an end of the connection rod is rotatably connected to the support frame by connecting the binaural.

In an embodiment of the present disclosure, the right connection seat is provided with a first limit circular rod, and the right connection seat is rotatably connected to the connection sleeve of the right collar body through the first limit circular rod; one side of the right connection seat is provided with a first insertion sleeve, and upper and lower sides of the first insertion sleeve are provided with a limit clamp slot.

In an embodiment of the present disclosure, the left connection seat is provided with a second limit circular rod, and the left connection seat is rotatably connected to the connection sleeve of the left collar body through the second limit circular rod; one side of the left connection seat is provided with a second insertion sleeve, and the alarm component is provided in the second insertion sleeve; upper and lower sides of the second insertion sleeve are respectively provided with an elastic buckle, the second insertion sleeve is inserted into the first insertion sleeve, and the elastic buckle is clamped into the limit clamp slot.

In an embodiment of the present disclosure, upper and lower sides of the alarm component are respectively provided with an acoustical generator, the two acoustical generators are symmetrically distributed; there is a fixed cylinder between the two acoustical generators, the fixed cylinder is a cylindrical cavity structure; one side wall of the fixed cylinder is provided with two limit through grooves, and a trigger seat is provided at a connection position between the fixed cylinder and the alarm component.

In an embodiment of the present disclosure, one side of the squeeze button is provided with a support circular plate, and a center position of one side of the support circular plate is provided with a trigger insertion rod; an outer circumference surface of the support circular plate is provided with a limit block, the trigger insertion rod is sleeved with a compression spring; the support circular plate is slidably connected to the limit through grooves of the fixed cylinder through the limit block, and the trigger insertion rod is matched with the trigger seat, the compression spring is supported between the trigger seat and the support circular plate.

The pet trainer with positioning and tracking function provided by the present disclosure has the following beneficial effects:

1. in the present disclosure, due to the rubber sheath sleeved on the restraint belt, adjacent two rubber sheaths can be tightly connected by a mutual cooperation between the connection plug and the connection slot, thereby protecting the restraint belt and effectively preventing it from being bitten and damaged by a pet dog, and ensuring the use reliability.

2. In the present disclosure, two positioning clamp blocks are manually pulled in opposite directions to lose a clamping relationship between the positioning clamp block and the stop block. Then, the positioning clamp block is pulled forward to slide and detach from the positioning clamp slot, allowing the receiver body to be quickly taken out from the installation seat. During an entire disassembly process, an assembly efficiency of the receiver body is improved without a need for tools, thus it is easier to charge and maintain in a later stage.

3. In the present disclosure, due to the proving with an electric shock absorber and an electric shock column, when the pet dog has a crossing behavior, a signal is sent to the receiver body of the collar through a remote control, the electric shock absorber is triggered to transmit an instruction or impose punishment. The electric shock column can emit static electricity to stimulate the pet dog, thereby more effectively achieving a purpose of dog training.

4. The present disclosure is driven by a dual headed motor to rotate the rotation block, which cooperates with a connection rod and a support frame, an elastic effect of a buffer spring is used to generate vibration for the fixed seat. During a training process of the pet dog, the vibration of the fixed seat can prompt and comfort the pet dog. The structure is simple, and an operation is flexible and convenient.

5. When the right connection seat and the left connection seat are in a separated state, a limit on the squeeze button is released. At the same time, a rebound effect of the compression spring is used to trigger the insertion rod to detach from the trigger seat, thereby triggering the alarm component to make the acoustical generator issue an alarm. Through a sound prompt, it can timely remind the owner after the device has been fall off, thus the structure is more reasonable.

BRIEF DESCRIPTION OF DRAWINGS

In order to provide a clearer explanation of the technical solution of the embodiments of the present disclosure, the accompanying drawings of the embodiments will be briefly introduced below.

The accompanying drawings in the following description only relate to some embodiments of the present disclosure, rather than limiting the present disclosure.

Numeral reference: 1. collar body; 101. restraint belt; 102. connection joint; 103. connection slider; 104. connection sleeve; 105. rubber sheath; 1051. connection plug; 1052. connection slot; 2. installation seat; 201. limit sliding groove; 202. connection frame; 203. positioning clamp groove; 204. stop block; 3. receiver body; 301. display panel; 302. locator; 303. charging port; 304. installation sleeve tube; 305. positioning clamp block; 3051. sliding rod; 3052. stretching spring; 306. electric shock absorber; 307. electric shock column; 4. fixed seat; 401. elastic strap; 402. installation cover; 403. support frame; 5. dual headed motor; 501. rotation block; 502. buffer spring; 503. connection rod; 6. right connection seat; 601. first limit circular rod; 602. first insertion sleeve; 603. limit clamp slot; 7. left connection seat; 701. second limit circular rod; 702. second insertion sleeve; 703. elastic buckle; 8. alarm component; 801. acoustical generator; 802. fixed cylinder; 803. limit through groove; 804. trigger seat; 9. squeeze button; 901. support circular plate; 902. trigger insertion rod; 903. limit block; 904. compression spring.

DESCRIPTION OF EMBODIMENTS

In order to render the purpose, scheme, and advantages of the technical solution of the present disclosure clearer, the following will provide a clear and complete description of the technical solution of embodiments of the present disclosure in combination with the accompanying drawings. Unless otherwise specified, terms used in the present specification have conventional meanings in the field. The same symbol in the attached drawings represents the same component.

Figure 1:
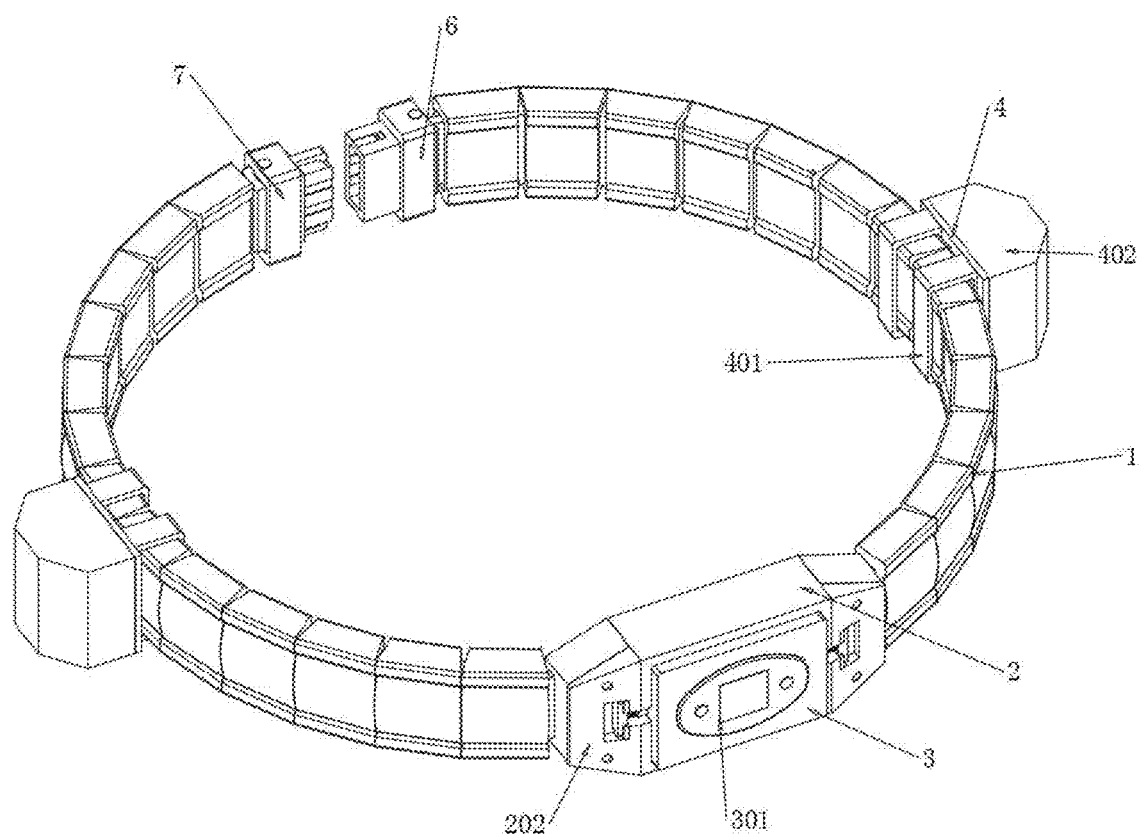
FIG. 1 is a schematic structural diagram in an overall axial view angle of an embodiment of the present disclosure.
Figure 2:
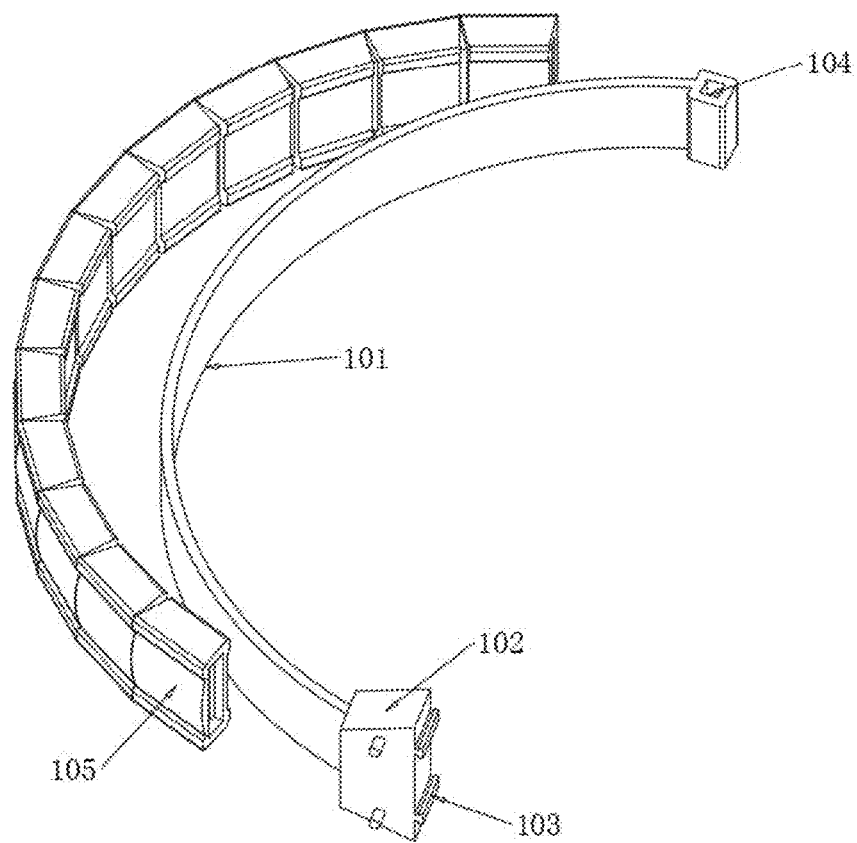
FIG. 2 is a schematic diagram of an explosion state structure of a collar body in an embodiment of the present disclosure.
Figure 3:
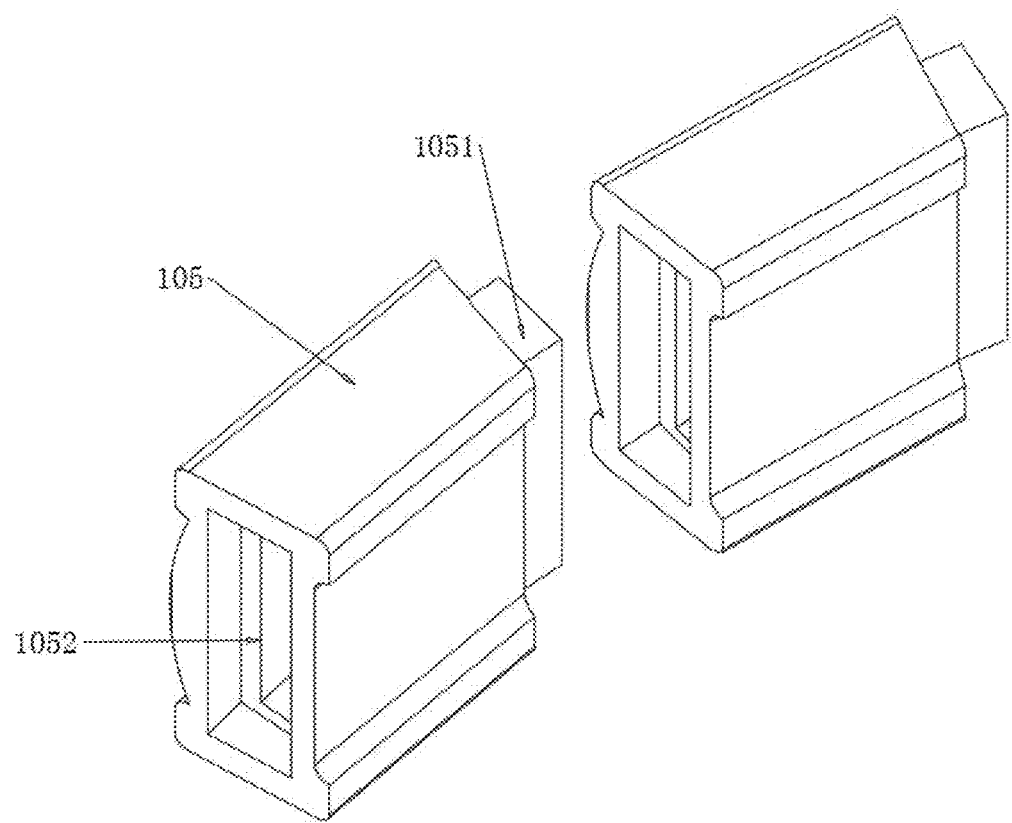
FIG. 3 is a schematic diagram of an explosive state structure of two adjacent rubber sheaths in an embodiment of the present disclosure.
Figure 4:
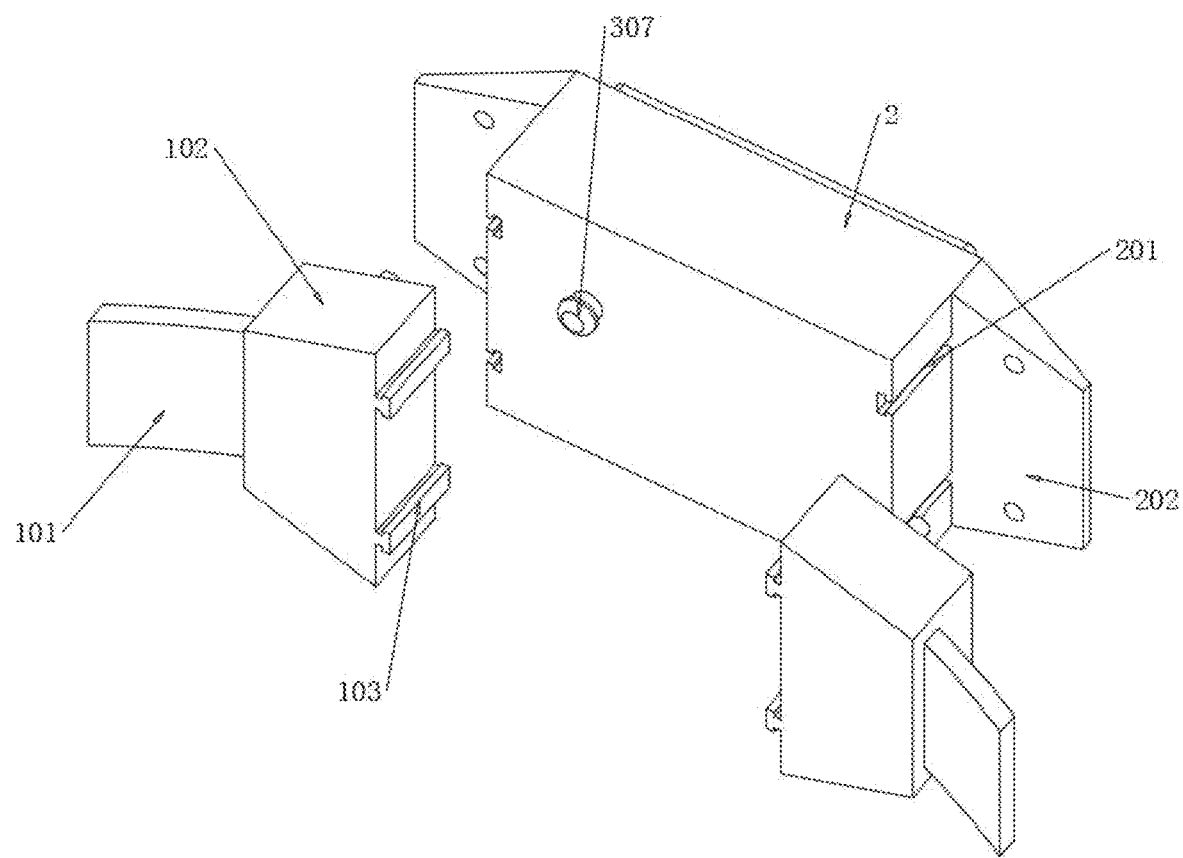
FIG. 4 is a schematic diagram of an explosive state structure of a connection joint and an installation seat in an embodiment of the present disclosure.
Figure 5:
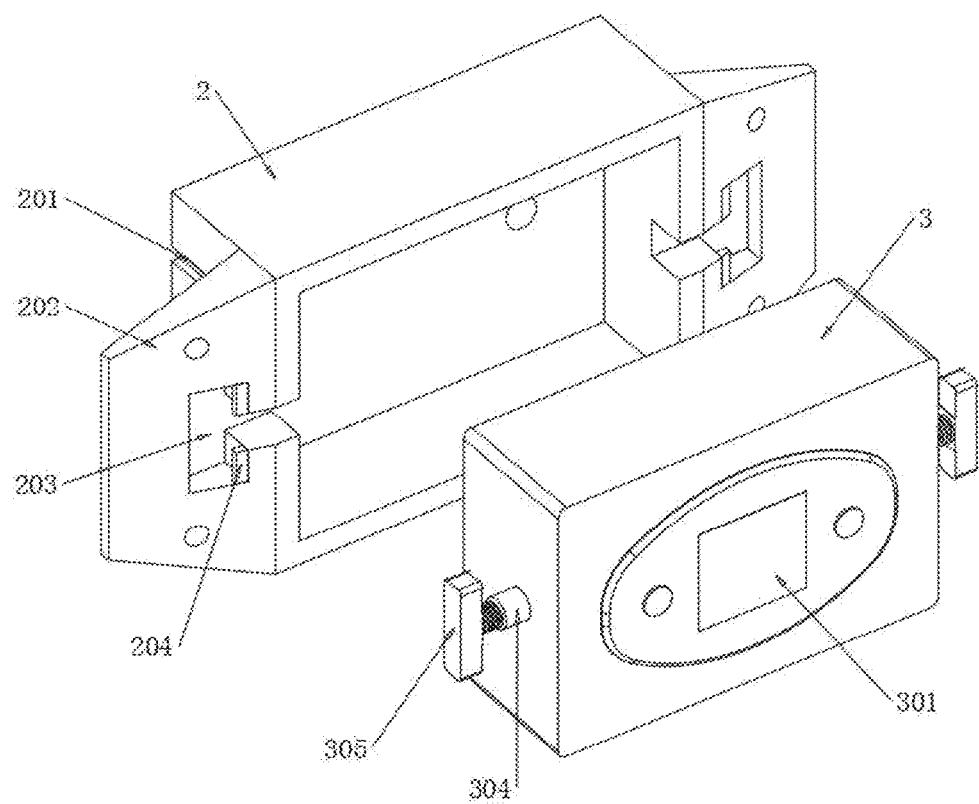
FIG. 5 is a schematic diagram of an explosive state structure of the installation seat and a receiver body in an embodiment of the present disclosure.
Figure 6:
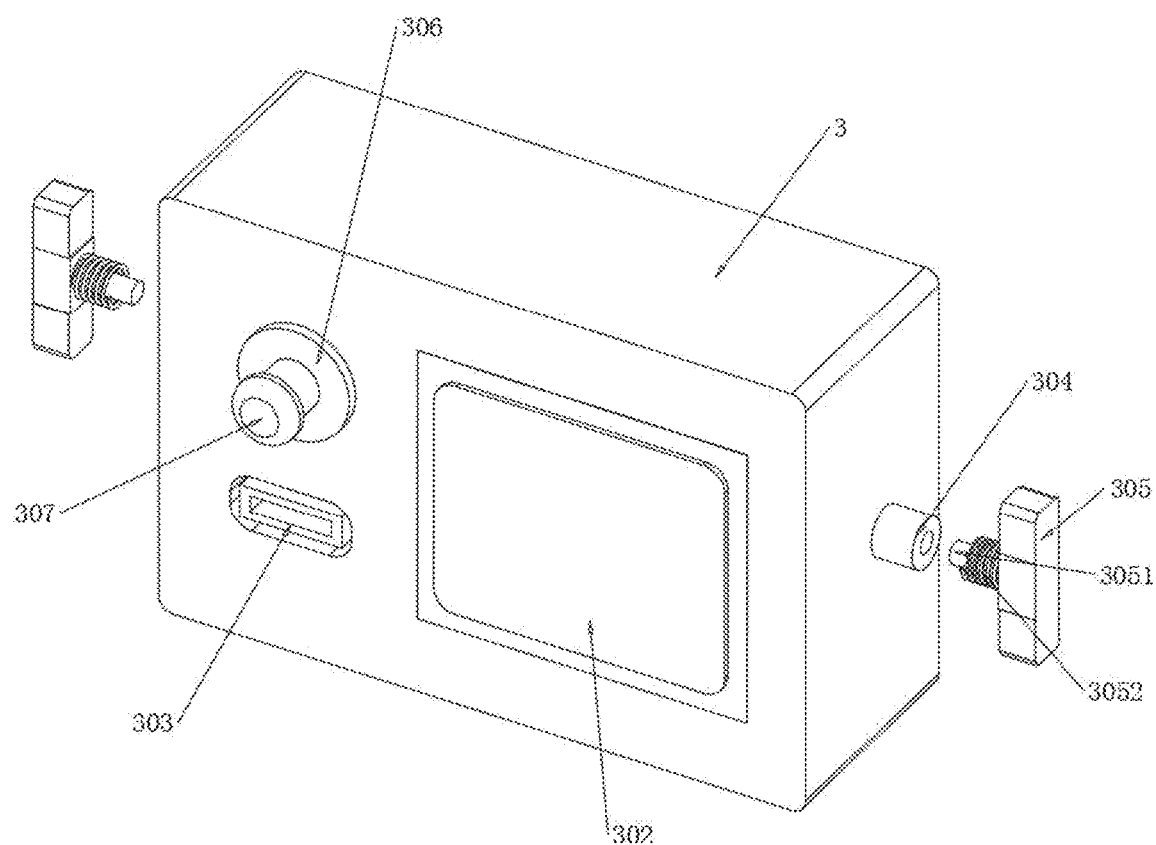
FIG. 6 is a schematic diagram of an explosion state structure of the receiver body and a positioning clamp block in an embodiment of the present disclosure.
Figure 7:
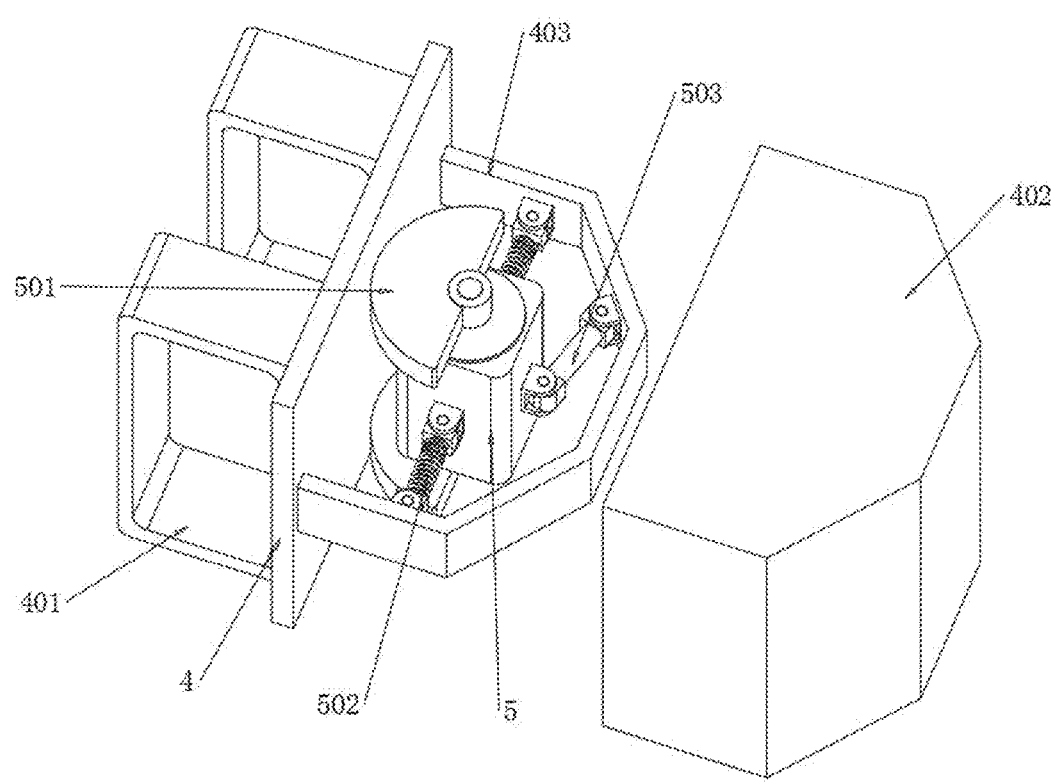
FIG. 7 is a schematic structural diagram of a fixed seat and a dual headed motor in an embodiment of the present disclosure.
Figure 8:
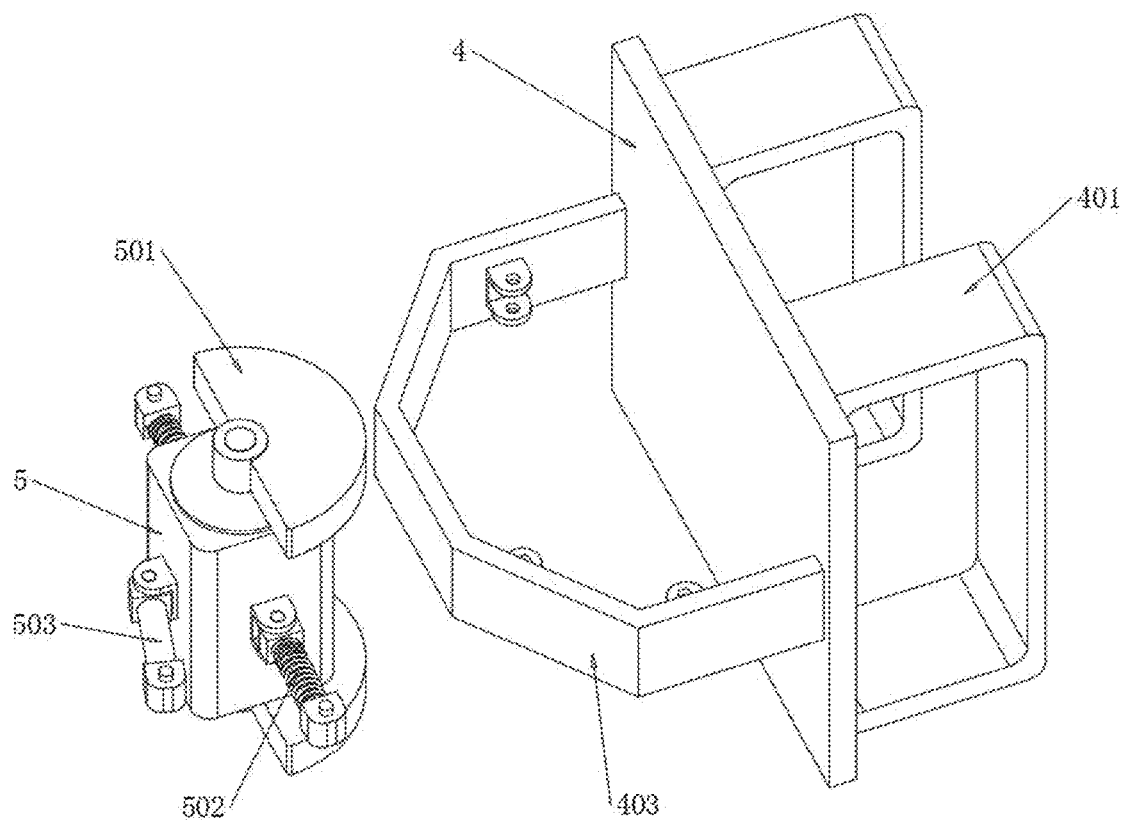
FIG. 8 is a schematic diagram of an explosion state structure of the fixed seat and the dual headed motor in an embodiment of the present disclosure.
Figure 9:
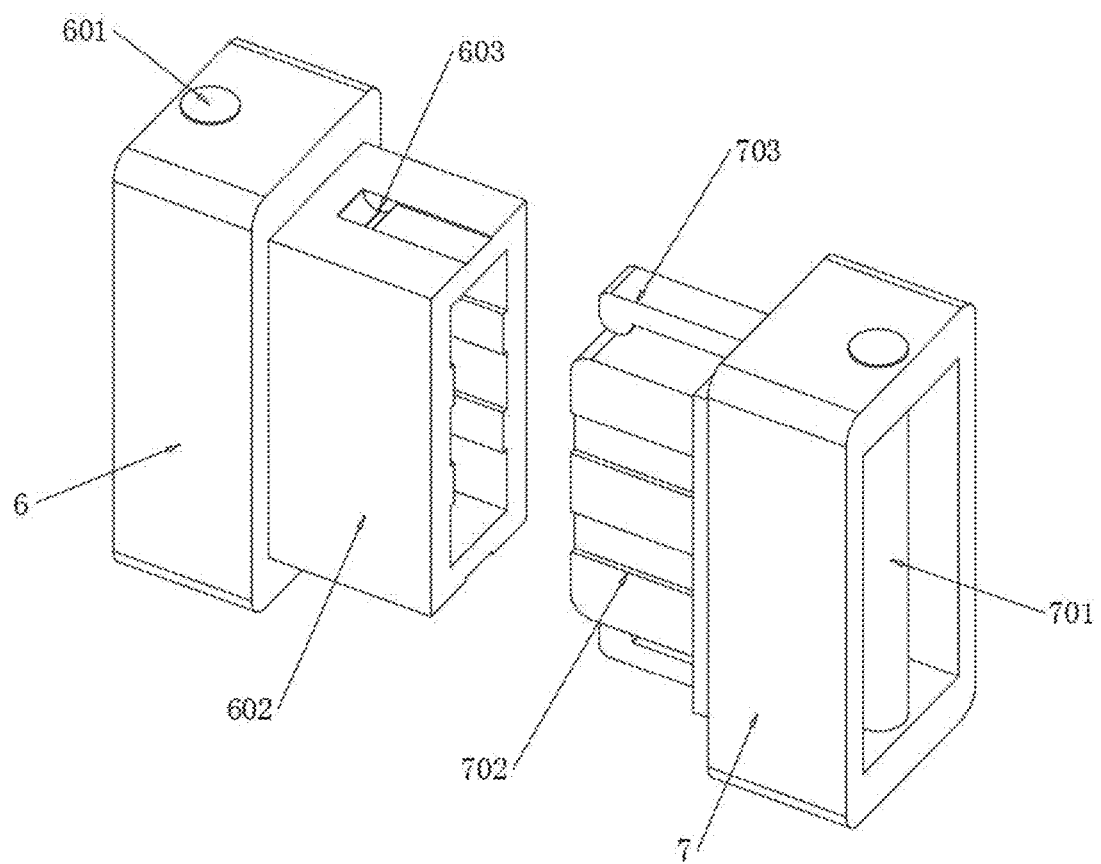
FIG. 9 is a schematic structural diagram of a right connection seat and a left connection seat in an embodiment of the present disclosure.
Figure 10:
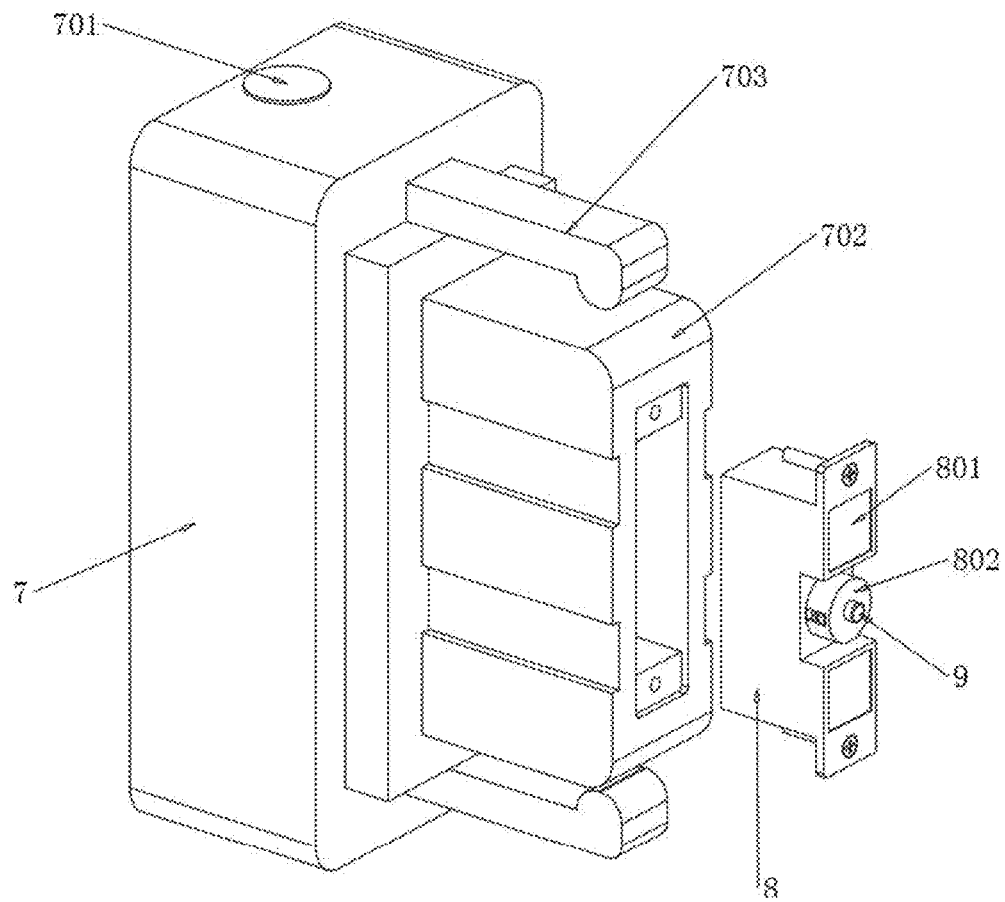
FIG. 10 is a schematic diagram of an explosion state structure of the left connection seat and an alarm component in an embodiment of the present disclosure.
Figure 11:
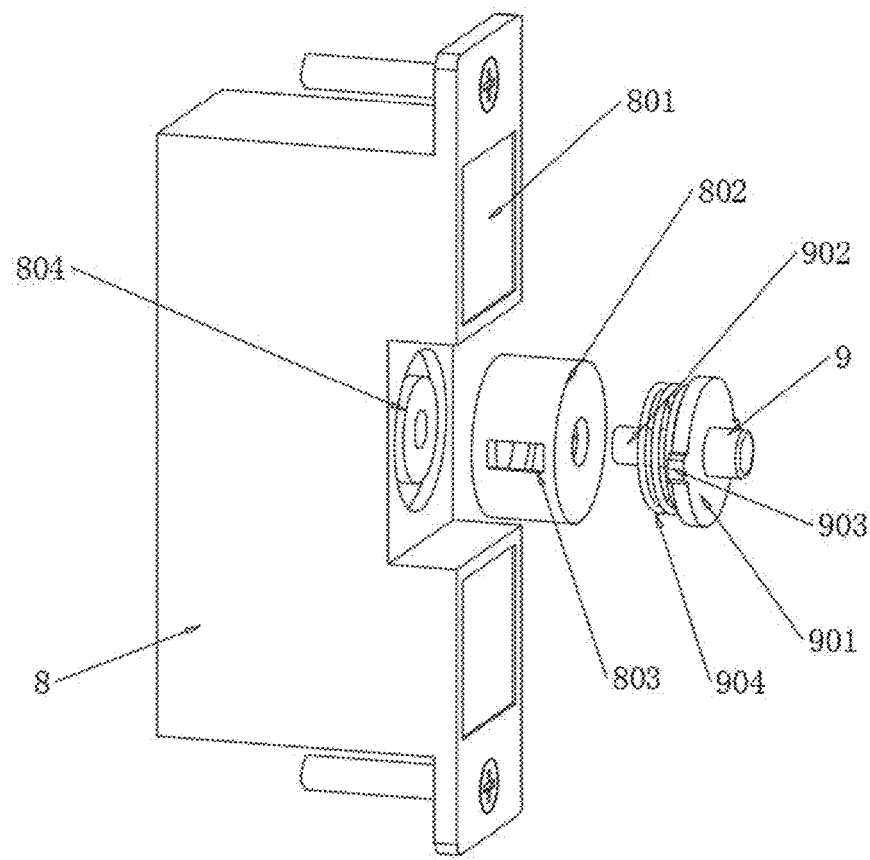
FIG. 11 is a schematic diagram of an explosion state structure of the alarm component and a squeeze button in an embodiment of the present disclosure.

Embodiment 1: Please refer to FIGS. 1 to 11.

The present disclosure provides a pet trainer with positioning and tracking function, including two collar bodies 1 symmetrically distributed at left and right sides, i.e., a right collar body 1 and a left collar body 1, an installation seat 2 provided between front ends of two collar bodies 1 and having a rectangular cavity structure; a receiver body 3 provided in the cavity of installation seat 2; a fixed seat 4 provided on opposite outer sides of the two collar bodies 1. One side of the fixed seat 4 is provided with a dual headed motor 5; rear ends of the left collar body 1 and the right collar body 1 are respectively provided with a left connection seat 7 and a right connection seat 6; an alarm component 8 is provided on the left connection seat 7; and the alarm component 8 is provided with a squeeze button 9.

The two collar bodies 1 both include a restraint belt 101, a connection joint 102, a connection slider 103, a connection sleeve 104, and a rubber sheath 105. One end of the restraint belt 101 is provided with the connection joint 102, and there are two connection sliders 103 on the connection joint 102, which are symmetrically distributed in an upward and downward manner. The other end of the restraint belt 101 is provided with the connection sleeve 104, and the restraint belt 101 is provided with the rubber sheath 105, there are a plurality of rubber sheath 105 that are distributed in a linear array manner.

One end of one rubber sheath 105 is provided with a connection plug 1051, and the other end of the rubber sheath 105 is provided with a connection slot 1052. The connection plug 1051 of the rubber sheath 105 is inserted into the connection slot 1052 of one adjacent rubber sheath 105. As the restraint belt 101 is sleeved with the rubber sheath 105, adjacent two rubber sheaths 105 can be tightly connected by a mutual cooperation between the connection plug 1051 and the connection slot 1052, thereby protecting the restraint belt 101 and effectively avoiding being bitten and damaged by a pet dog.

There are two limit sliding grooves 201 on left and right-side walls of the installation seat 2, and a connection frame 202 is provided at left and right ends of the installation seat 2. The installation seat 2 is slidably connected to the connection slider 103 of the connection joint 102 through the limit sliding groove 201, and the connection frame 202 is fixedly connected to the connection joint 102 through a bolt. A front of the connection frame 202 is provided with a positioning clamp groove 203, and there are two stop blocks 204 at a position of the positioning clamp groove 203.

A front of the receiver body 3 is provided with a display panel 301, a rear of the receiver body 3 is provided with a locator 302, one side of the locator 302 is provided with a charging port 303. Left and right ends of the receiver body 3 are provided with an installation sleeve tube 304, a positioning clamp block 305 is provided on the installation sleeve tube 304. A rear of the receiver body 3 is provided with an electric shock absorber 306, and an electric shock column 307 is provided on the electric shock absorber 306, the electric shock column 307 runs through a rear wall of the installation seat 2. During a wearing process, the electric shock column 307 can come into contact with the pet dog. In an implementation, an electric shock intensity is between 0.01 and 0.03 volts, with a relatively strong electric shock intensity of 0.05 volts and a stronger electric shock intensity of 0.1 volts. When the pet dog has a crossing behavior, a signal is sent to the receiver body 3 of the collar through a remote control, thereby triggering the electric shock absorber 306 to transmit an instruction or impose punishment, the electric shock column 307 can be configured to emit static electricity to stimulate the pet dog.

One side of the positioning clamp block 305 is provided with a sliding rod 3051, the sliding rod 3051 is sleeved with a stretching spring 3052. The sliding rod 3051 is slid and inserted into the installation sleeve tube 304, and two ends of the stretching spring 3052 are respectively connected to the installation sleeve tube 304 and the positioning clamp block 305. The positioning clamp block 305 is clamped in the positioning clamp groove 203, and the positioning clamp block 305 is in contact with the stop block 204. By manually pulling the two positioning clamp blocks 305 in opposite directions, the positioning clamp block 305 loses a clamping relationship with the stop block 204. Then, the positioning clamp block 305 is pulled forward to slide and detach from the positioning clamp groove 203, allowing the receiver body 3 to be quickly taken out from the installation seat 2; during an entire disassembly process, an assembly efficiency of the receiver body 3 is improved without a need for tools, thus it is easier to charge and maintain at a later stage. It can be understood that there is also a power supply in the receiver body 3, which is configured to power electrical components in the receiver body 3.

Where, there are two elastic straps 401 on one side of the fixed seat 4, and the elastic strap 401 is sleeved on the rubber sheath 105. On the other side of the fixed seat 4 is provided with an installation cover 402, and a support frame 403 is provided in the installation cover 402. The support frame 403 is fixedly connected to the fixed seat 4, and the dual headed motor 5 is provided on the support frame 403. It can be understood that the support frame 403 is detachably provided with a power supply configured to supply power to the dual headed motor 5 for charging and maintenance.

Upper and lower rotation ends of the dual headed motor 5 are provided with a rotation block 501, and the two rotation blocks 501 are both in a shape of semicircular cylinder. A buffer spring 502 is provided on front and rear sides of the dual headed motor 5 by connecting binaural, and the buffer spring 502 is rotatably connected to the support frame 403 by connecting the binaural. A connection rod 503 is provided on one side of the dual headed motor 5 by connecting the binaural for rotation, and an end of the connection rod 503 is rotatably connected to the support frame 403 by connecting the binaural for rotation. The present disclosure is driven by the dual headed motor 5 to rotate the rotation block 501, and the connection rod 503 and the support frame 403 cooperate with each other. An elastic effect of the buffer spring 502 is used, the fixed seat 4 can generate vibration, so that during a training process of the pet dog, the vibration of the fixed seat 4 can provide prompts and comfort to the pet dog.

Embodiment 2: Please refer to FIGS. 9 to 11.

The right connection seat 6 is provided with a first limit circular rod 601, and the right connection seat 6 is rotatably connected to the connection sleeve 104 of the right collar body 1 through the first limit circular rod 601. One side of the right connection seat 6 is provided with a first insertion sleeve 602, and upper and lower sides of the first insertion sleeve 602 are provided with a limit clamp slot 603.

The left connection seat 7 is provided with a second limit circular rod 701, and the left connection seat 7 is rotatably connected to the connection sleeve 104 of the left collar body 1 through the second limit circular rod 701. One side of the left connection seat 7 is provided with a second insertion sleeve 702, and the alarm component 8 is provided in the second insertion sleeve 702. Upper and lower sides of the second insertion sleeve 702 are provided with an elastic buckle 703.

Upper and lower sides of the alarm component 8 are provided with an acoustical generator 801, and the two acoustical generators 801 are symmetrically distributed. There is a fixed cylinder 802 between the two acoustical generators 801, which is a cylindrical cavity structure. A side wall of the fixed cylinder 802 is provided with two limit through grooves 803, and a trigger seat 804 is provided at a connection position between the fixed cylinder 802 and the alarm component 8.

One side of the squeeze button 9 is provided with a support circular plate 901, and a center position at one side of the support circular plate 901 is provided with a trigger insertion rod 902. An outer circumferential surface of the support circular plate 901 is provided with a limit block 903, the trigger insertion rod 902 is sleeved with a compression spring 904. The support circular plate 901 is slidably connected to the limit through groove 803 of the fixed cylinder 802 through the limit block 903, and the trigger insertion rod 902 is matched with the trigger seat 804. The compression spring 904 is supported between the trigger seat 804 and the support circular plate 901. When the right connection seat 6 is connected to the left connection seat 7, the second insertion sleeve 702 is coupled and inserted into the first insertion sleeve 602, and the elastic buckle 704 is clamped to the limit clamp slot 603, the squeeze button 9 is in contact with an inner wall of the first insertion sleeve 602. The trigger insertion rod 902 is slid and inserted into the trigger seat 804. When the right connection seat 6 is separated from the left connection seat 7, a limit on the squeeze button 9 is released, at the same time, a rebound effect of the compression spring 904 is used, the trigger insertion rod 902 is detached from the trigger seat 804, thereby triggering alarm component 8 to drive the acoustical generator 801 to issue an alarm. Through a sound prompt, it can timely remind the owner after the device has been fall off.

Specific usage and function of this embodiment: in the present disclosure, by a mutual cooperation between the connecting plug 1051 and the connecting slot 1052, adjacent two rubber sheaths 105 can be tightly connected, thereby protecting the restraint belt 101 and effectively preventing it from being bitten and damaged by the pet dog; by manually pulling two positioning clamp blocks 305 in opposite directions, the positioning clamp block 305 loses a clamping relationship with the stop block 204. Then, the positioning card block 305 is pulled forward, the positioning clamp block 305 is slid out and detached from the positioning clamp slot 203, allowing the receiver body 3 to be quickly taken out from the installation seat 2. During the entire disassembly process, the assembly efficiency of the receiver body 3 is improved due to no need of tools. During a wearing process, the electric shock column 307 can come into contact with the pet dog. When the pet dog has a crossing behavior, a signal is sent to the receiver body 3 of the collar through the remote control, the electric shock column 306 is trigged to transmit an instruction or impose punishment. The electric shock column 307 can emit static electricity to stimulate the pet dog, thereby more effectively achieving the purpose of dog training. The rotating block 501 is driven to rotate by the dual headed motor 5 which provides power. Through a mutual cooperation of the connection rod 503 and the support frame 403, and the elastic effect of the buffer spring 502 is used, the fixed seat 4 can generate vibration. Therefore, during the training process of the pet dog, the vibration of the fixed seat 4 can provide reminders and comfort to the pet dog. When the right connection seat 6 is connected to the left connection seat 7, the second insertion sleeve 702 is coupled and inserted into the first insertion sleeve 602, the elastic buckle 703 is clamped to the limit clamp slot 603. The squeeze button 9 is in contact with the inner wall of the first insertion sleeve 602, and the trigger insertion rod 902 is slid and inserted into the trigger seat 804. When the right connection seat 6 is separated from the left connection seat 7, the limit of the squeeze button 9 is released. At the same time, the rebound effect of the compression spring 904 is used to trigger the insertion rod 902 to be detached from the trigger seat 804, thereby triggering the alarm component 8 to make the acoustical generator 801 issue an alarm. Through the sound prompt, it is possible to promptly remind the owner when the device has been detached from.

The above are only exemplary embodiments of the present disclosure, and are not intended to limit the protection scope of the present disclosure. The protection scope of the present disclosure is determined by the accompanying claims.

What is claimed is:

1. A pet trainer with positioning and tracking function, comprising:
   two collar bodies that are symmetrically distributed at left and right sides, the two collar bodies are a left collar body and a right collar body;
   an installation seat provided between front ends of the two collar bodies and being a rectangular cavity structure,
   a receiver body provided in the cavity of the installation seat;
   a fixed seat provided on opposite outer sides of the two collar bodies; one side of the fixed seat is provided with a dual headed motor; rear ends of one left collar body and one right collar body are respectively provided with a left connection seat and a right connection seat; the left connection seat is provided with an alarm component, and the alarm component is provided with a squeeze button;
   wherein upper and lower sides of the alarm component are respectively provided with an acoustical generator, the two acoustical generators are symmetrically distributed;
   there is a fixed cylinder between the two acoustical generators, and the fixed cylinder is a cylindrical cavity structure;
   one side wall of the fixed cylinder is provided with two limit through grooves, and a trigger seat is provided at a connection position between the fixed cylinder and the alarm component.

2. The pet trainer with positioning and tracking function as claimed in claim 1, wherein the two collar bodies both comprise a restraint belt, a connection joint, a connection slider, a connection sleeve, and a rubber sheath; one end of the restraint belt is provided with the connection joint, there are two connection sliders provided on the connection joint, and the two connection sliders are symmetrically distributed up and down;

the other end of the restraint belt is provided with the connection sleeve, the restraint belt is sleeved with the rubber sheath, and there are a plurality of rubber sheaths distributed in a linear array manner;

one end of each of the plurality of rubber sheaths is provided with a connection plug, and the other end of each of the plurality of rubber sheaths is provided with a connection slot;

the connection plug of each of the plurality of rubber sheaths is inserted into the connection slot of one adjacent rubber sheath.

3. The pet trainer with positioning and tracking function as claimed in claim 2, wherein left and right side walls of the installation seat are provided with two limit sliding grooves, and left and right ends of the installation seat are provided with a connection frame;

the installation seat is slidably connected to the two connection sliders of the connection joint through the two limit sliding grooves, and the connection frame is fixedly connected to the connection joint through a bolt;

a front of the connection frame is provided with a positioning clamp groove, and there are two stop blocks at a position of the positioning clamp groove.

4. The pet trainer with positioning and tracking function as claimed in claim 3, wherein a front of the receiver body is provided with a display panel, a rear of the receiver body is provided with a locator, one side of the locator is provided with a charging port, left and right ends of the receiver body are provided with an installation sleeve tube, the installation sleeve tube is provided with a positioning clamp block, the rear of the receiver body is further provided with an electric shock absorber, and the electric shock absorber is provided with an electric shock column, and the electric shock column runs through a rear wall of the installation seat;

one side of the positioning clamp block is provided with a sliding rod, which is sleeved with a stretching spring;

the sliding rod is inserted into the installation sleeve tube, and two ends of the stretching spring are respectively connected to the installation sleeve tube and the positioning clamp block;

the positioning clamp block is clamped in the positioning clamp groove, and the positioning clamp block is in contact with the two stop blocks.

5. The pet trainer with positioning and tracking function as claimed in claim 2, wherein one side of the fixed seat is provided with two elastic straps, the two elastic straps are sleeved on each of the plurality of rubber sheaths, and an installation cover is provided on the other side of the fixed seat, a support frame is provided in the installation cover;

the support frame is fixedly connected to the fixed seat, and the dual headed motor is provided on the support frame.

6. The pet trainer with positioning and tracking function as claimed in claim 5, wherein upper and lower rotation ends of the dual headed motor are respectively provided with a rotation block, the two rotation blocks are both in a shape of semicircular cylinder;

front and rear sides of the dual headed motor are provided with a buffer spring and the buffer spring is rotatably connected to the support frame;

one side of the dual headed motor is provided with a connection rod, and an end of the connection rod is rotatably connected to the support frame.

7. The pet trainer with positioning and tracking function as claimed in claim 2, wherein the right connection seat is provided with a first limit circular rod, and the right connection seat is rotatably connected to the connection sleeve of the right collar body through the first limit circular rod;

one side of the right connection seat is provided with a first insertion sleeve, and upper and lower sides of the first insertion sleeve are provided with a limit clamp slot.

8. The pet trainer with positioning and tracking function as claimed in claim 7, wherein the left connection seat is provided with a second limit circular rod, and the left connection seat is rotatably connected to the connection sleeve of the left collar body through the second limit circular rod;

one side of the left connection seat is provided with a second insertion sleeve, and the alarm component is provided in the second insertion sleeve;

upper and lower sides of the second insertion sleeve are respectively provided with an elastic buckle, the second insertion sleeve is inserted into the first insertion sleeve, and the elastic buckle is clamped into the limit clamp slot.

9. The pet trainer with positioning and tracking function as claimed in claim 1, wherein one side of the squeeze button is provided with a support circular plate, and a center position of one side of the support circular plate is provided with a trigger insertion rod;

an outer circumference surface of the support circular plate is provided with a limit block, the trigger insertion rod is sleeved with a compression spring;

the support circular plate is slidably connected to the two limit through grooves of the fixed cylinder through the limit block, and the trigger insertion rod is matched with the trigger seat, the compression spring is supported between the trigger seat and the support circular plate.

* * * * *